United States Patent [19]

Shipman et al.

[11] Patent Number: 4,703,720
[45] Date of Patent: Nov. 3, 1987

[54] PEDESTAL AQUARIUM

[75] Inventors: Harvey L. Shipman, Hallsville; Dennis D. Rieger, Longview, both of Tex.

[73] Assignee: Betty J. Rieger, White Oak, Tex. ; a part interest

[21] Appl. No.: 833,187

[22] Filed: Feb. 26, 1986

[51] Int. Cl.$^1$ ............................................. A01K 63/00
[52] U.S. Cl. ........................................................ 119/5
[58] Field of Search ............................... 119/5; 40/406

[56] References Cited

U.S. PATENT DOCUMENTS

| | | | |
|---|---|---|---|
| 1,723,272 | 8/1929 | Emma | 119/5 X |
| 1,939,583 | 12/1933 | Welshausen | 119/5 X |
| 3,807,356 | 4/1974 | Pratt | 119/5 |
| 4,148,730 | 4/1979 | Willinger | 119/5 X |
| 4,481,905 | 11/1984 | Fonseca | 119/5 |
| 4,612,876 | 9/1986 | Tigert | 119/5 |

Primary Examiner—Robert P. Swiatek
Attorney, Agent, or Firm—Harvey B. Jacobson

[57] ABSTRACT

An upwardly opening aquarium tank is provided including an outwardly convex partial spherical bottom wall. A base is provided including a standard portion of large cross sectional area defining an upwardly opening pressure chamber and the standard portion includes peripheral wall structure from whose upper marginal portion the bottom wall of the tank is supported. Seal structure is provided for forming a fluid tight seal between the tank bottom wall and the standard portion and the bottom wall includes air inlet check valve structure opening therethrough by which pressurized air from the pressure chamber may be admitted into the interior of the lower portion of the tank through the bottom wall thereof. The base includes an air pump for supplying air under pressure to the pressure chamber and a light diffusing filter panel is supported from the valve structure and overlies the bottom wall in spaced relation relative thereto. In addition, a source of illumination is contained within the pressure chamber and is operative to cast light upwardly through the tank bottom wall and the light diffusing filter panel.

13 Claims, 3 Drawing Figures

PEDESTAL AQUARIUM

BACKGROUND OF THE INVENTION

Field of the Invention

This invention relates to an aquarium including a bottom wall having an air inlet check valve sealingly secured therethrough and a base is provided for the aquarium defining an upwardly opening air pressure chamber bounded by peripheral wall portions whose upper marginal edges enjoy an airtight seal with an area of the bottom wall of the aquarium disposed about the air inlet check valve. Air under pressure is supplied to the pressure chamber from a suitable source of air under pressure and the air passes upwardly through the air inlet check valve to aerate the water within the aquarium without any connection between the aquarium and the pedestal base therefor.

Similar inventions are found in patents classified in class 119, subclass 5.

Description of Related Art

Various different forms of aquariums including base structures containing air pumps heretofore have been provided such as those disclosed in U.S. Pat. Nos. 3,232,271, 3,557,753, 3,855,970, 4,117,805, 4,151,810 and 4,196,695. However, these previously known forms of aquariums are not constructed in a manner whereby the fish and other marine life therein may be removed from the aquarium and the aquarium may then be merely lifted from the base and emptied of water for cleaning and refilling with fresh water before again placing the aquarium upon its base and reintroducing the marine life to the interior of the aquarium.

SUMMARY OF THE INVENTION

The aquarium of the instant invention is constructed in a manner whereby it may have the marine life therein removed and the aquarium may be readily removed from its pedestal, emptied and refilled with water prior to reintroduction of the marine life thereinto completely independent of disconnection of any water aerating structure or heating structure from the aquarium.

The aquarium may be constructed with a planar horizontal bottom or may be with an upwardly opening semi-spherical bottom, which latter form is illustrated in the drawings and specifically described hereinafter.

When the invention is equipped with an upwardly opening semispherical bottom the air inlet check valve structure is sealingly secured through the center of the bottom and a screen panel may be used about the air inlet check valve in spaced relation to the internal surfaces of the adjacent bottom wall portions. In this manner, the upward bubbling of air through the water in the aquarium immediately above the air inlet check valve structure creates full circulatory movement of the water in the aquarium such that the aquarium water is constantly filtered by the screen panel and solid contaminants filtered out of the flow of water within the aquarium is retained beneath the screen or filter panel.

In addition to the pressure chamber of the base having air under pressure therein, the pressure chamber also may contain electrically actuated illumination means whereby the interior of the aquarium may be illuminated by light passing upwardly through the transparent bottom wall of the aquarium from the pressure chamber of the base.

The main object of this invention is to provide an aquarium constructed in a manner enabling the aquarium to be more readily cleaned.

A further object of this invention is to provide an aquarium including water aeration structure operatively associated with filter media within the aquarium in a manner such that the introduction of air into the aquarium also will effect complete circulation of the water within the aquarium through the filter media.

Another object of this invention is to provide an aquarium providing means whereby the interior of the aquarium may be readily illuminated through the utilization of electrically actuated illumination means disposed exteriorly of the aquarium.

Still another important object of this invention is to provide an aquarium with exterior illuminating means disposed below the bottom wall of the aquarium in a totally obscured position.

A final object of this invention to be specifically enumerated herein is to provide an aquarium in accordance with the preceding objects and which will conform to conventional forms of manufacture, be of simple construction and easy to clean so as to provide a device that will be economically feasible, longlasting and relatively troublefree to maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
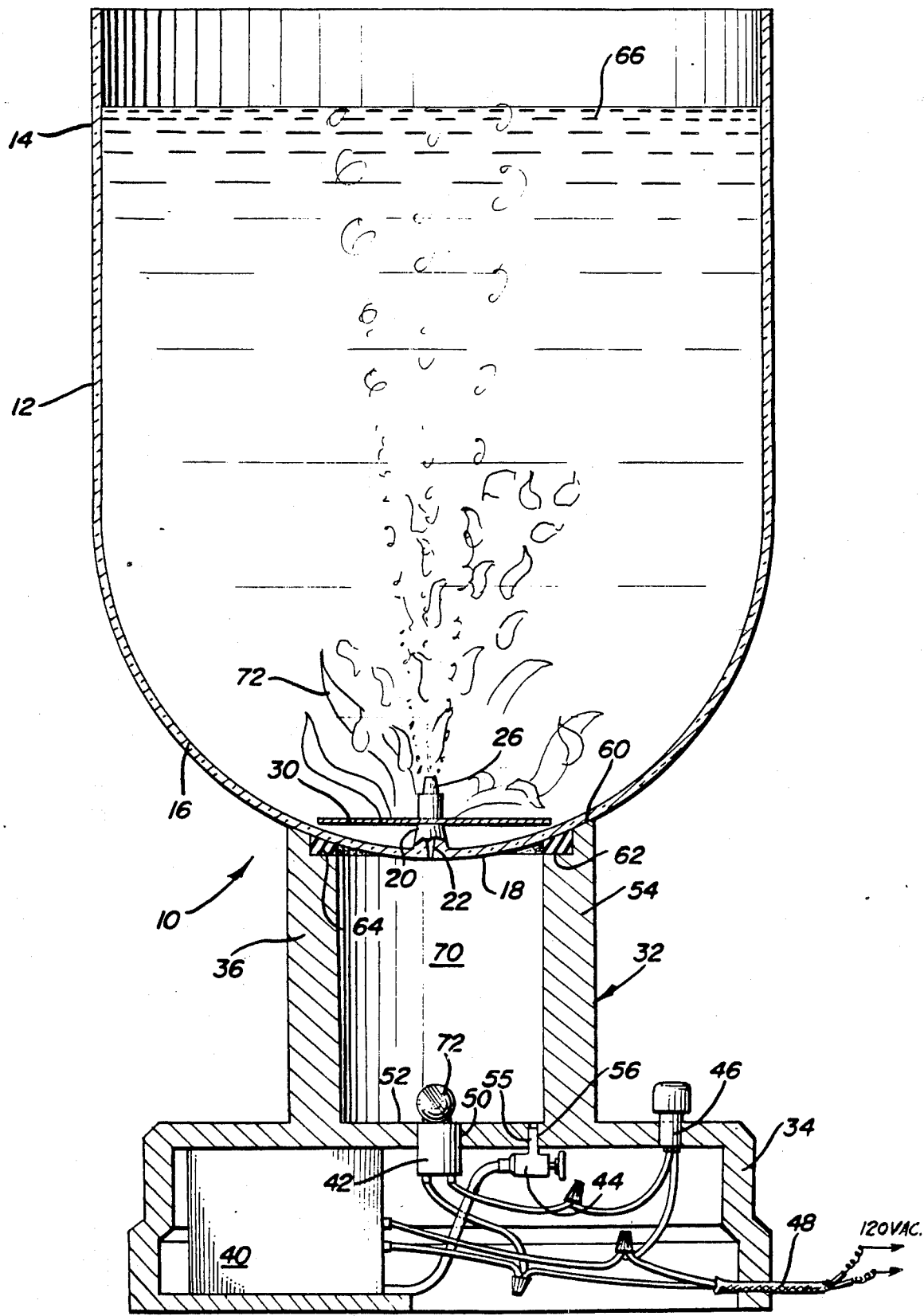
FIG. 1 is a vertical sectional view illustrating the pedestal aquarium of the instant invention.
Figure 2:
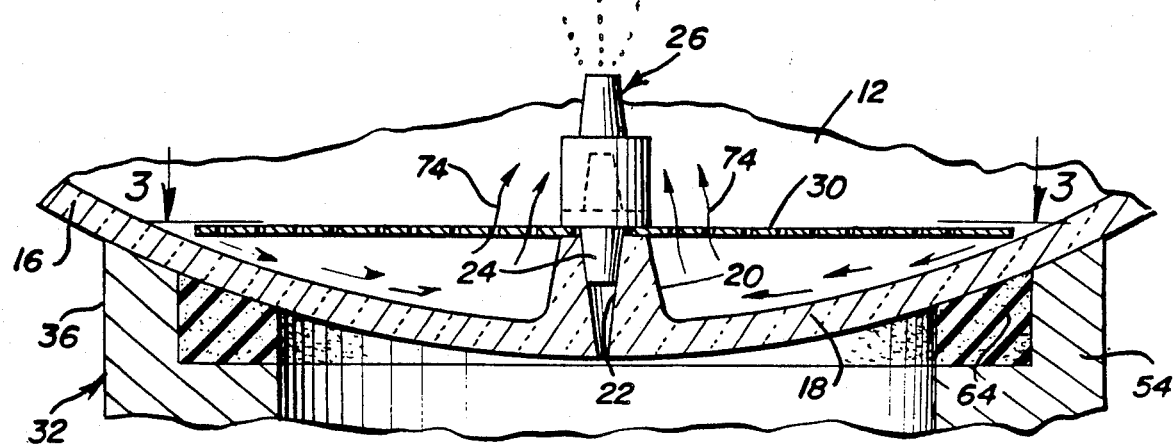
FIG. 2 is an enlarged fragmentary vertical sectional view of the adjoining portions of the aquarium bottom and the supportive pedestal for the aquarium.
Figure 3:
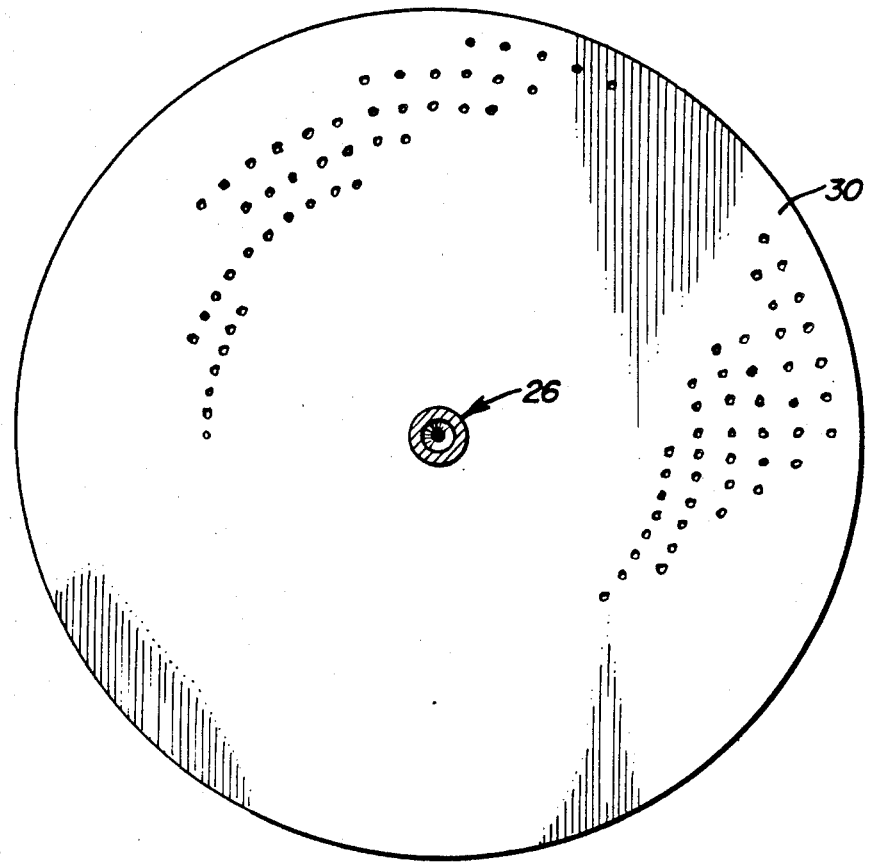
FIG. 3 is a planned view of the filter panel of the aquarium.

Referring now more specifically to the drawings the numeral 10 generally designates the pedestal aquarium assembly of the instant invention. The assembly 10 includes an upwardly opening tank 12 having cylindrical sidewalls 14 and a semi-spherical bottom wall 16. The vertical height of the sidewalls 14 may be greater or less than the diameter of the tank 12 and the transparent central portion 18 of the bottom wall 16 includes an upstanding projection 20 having a downwardly tapering vertical passage 22 formed therethrough. A downwardly projecting stem portion 24 of a combined air inlet and check valve assembly 26 is frictionally retained and sealingly seated within the upper end of the vertical passage 22. In addition, a screen or filter panel 30 is removably supported from the valve assembly 26 in the space relation relative to the bottom wall 16, the outer peripheral portions of the filter panel 30 also being spaced from the bottom wall 16.

The assembly 10 additionally includes a pedestal referred to in general by the reference numeral 32 including a lower hollow base portion 34 and an upper standard portion 36. The base portion 34 encloses an air pump 40, an electric light assembly 42 and an air valve 44. The pump 40, light assembly 42 and manually actuable switch 46 are electrically connected to a suitable source of electrical potential (not shown) through an extension cord 48. The pump 40 may be separately switched or may be actuated whenever current is supplied to the extension cord 48. On the other hand, the light assembly 42 is under the control of switch 46.

The light assembly 42 is removably sealingly received through an opening 50 provided therefor in the top wall 52 of the hollow base portion 34 and valve 44 includes an outlet neck 55 removably sealingly received in a small diameter passage 56 formed through the top wall 52.

The pedestal 32 includes an upstanding cylindrical wall 54 formed integral with and projecting upwardly from the top wall 52, the opening 50 and passage 56 being disposed within the confines of the cylindrical wall 54.

The upper end of the cylindrical wall 54 includes an outer annular seat 60 which conforms to and against which the central portion 18 of the bottom wall 16 abuts. In addition, the inner periphery of the upper end of the cylindrical wall 54 includes a circumferential recess 62 in which an annular seal member 64 is received. The upper surface of the seal member 64 is contoured to conform to the opposing surfaces of the bottom wall 16 and it is to be noted that the seal member 64 is constructed of resilient material and that the upper surface thereof, when the tank 12 is removed, projects slightly above the annular seat 60.

When the proper quantity of water 66 is disposed within the tank 12, the weight of the tank resting upon seal member 64 is sufficient to downwardly compress the seal member 64 until the central portion 18 of the bottom wall 16 abuts against the annular seat 60. Thus, a portion of the weight of the tank 12 is supported directly from the seal member 64 and the remaining portion of the weight of the tank 12 is supported from the annular seat 60. The seal member 64 forms a fluid tight seal between the central portion 18 of the bottom wall 16 and the standard portion 36.

The interior of the standard portion 36 defines a pressure chamber 70 into which air under pressure is admitted from the valve 44. The amount of pressure within the chamber 70 may be regulated by the valve 44 and the valve assembly 26 is operative to pass air upward therethrough from the chamber 70 into the lower end of the tank 12. The check valve assembly 26 is of a construction whereby air will not be allowed to pass upwardly therethrough until such time as the air pressure within the chamber 70 is appreciably greater than the static pressure of the water 66 at the bottom of the tank 12. In this manner, whenever the air pressure within the chamber 70 is not sufficient to allow upward passage of air through the valve assembly 26, water will be prevented from moving downwardly through the valve assembly 26 into the chamber 70.

The light assembly 42 includes a light bulb 72 advantageously positioned within the chamber 70 to allow rays of light to pass upwardly through the central portion 18 of the bottom wall 16. The filter panel 30 is of a construction which will allow at least a major portion of the light therethrough and which will also serve to diffuse the light passing therethrough.

Although the light assembly 42 is illustrated as supported in the bottom of the chamber 70, the light assembly 42 could be in the form of a small annular fluorescent light mounted in an upper portion of the chamber 70.

Marine vegetation 72 may be anchored relative to the filter panel 30 and the taper of the shank portion 24 and the vertical passage 22 may be approximately two degrees whereby a friction fit of the shank portion 24 within the passage 22 also will comprise a fluid tight seal.

In operation, the pump 40 supplies air to the chamber 70 at a pressure determined by the valve 44 and when the pressure within the chamber 70 is sufficient air under pressure will pass upward through the valve assembly 26 and into the interior of the lower central portion of the tank 12 in order to aerate the water 66 therein. The positioning of the valve assembly 26 within the tank 12 in the manner illustrated and the discharge of air therefrom creates a central upward columnar flow of water within the tank 12. Accordingly, there is a full circulatory flow of water within the tank 12 with water in the upper portion of the tank 12 flowing radially outward from the central portion of the tank, the water about the outer periphery of the tank 12 flowing downwardly along the inner surfaces thereof and the water in the lower portion of the tank 12 flowing downwardly and inwardly along the bottom wall 16 toward the projection 20 and then upward through the filter panel 30 as indicated by the arrows 74. Thus, inasmuch as the outer peripheral edges of the filter panel 30 are spaced from the bottom wall 16, any solid contaminants within the water being fully circulated throughout the tank 12 move inward beneath the filter panel 30 between the outer peripheral edges thereof and the bottom wall 16 and are then trapped beneath the filter panel 30 as the water flows upward as indicated by the arrows 74. This creates a very effective water filtering system powered only by the admittance of air into the tank 12 through the valve assembly 26 and the light diffusing filter panel 30 may be readily viewed from above the tank 12 to determine the amount of solid contaminants filtered out of the circulating water 60 within the tank 12 and trapped beneath the filter panel 30. Thus, a readily viewable visual indication is given when the filter panel 30 and the interior of the tank 12 need to be cleaned. Further, a thermostatically controlled electric heater may be positioned within the chamber in at least reasonably good heat transfer relation with the central portion 18 of the bottom wall 16.

Although the tank 12 is of a relatively small size and includes a partial spherical bottom wall 16, it is to be noted that the invention may be carried out through the utilization of a larger tank having a planar bottom wall and supported from a pedestal similar to the pedestal 32 but of considerably larger plan area and wherein a larger base portion includes three or more standard portions corresponding to the standard portion 36. Such a larger pedestal 32 equipped with a plurality of standard portions 36 may utilize only one pressurized chamber corresponding to the chamber 70, or each standard portion 36 may define an operative chamber 70 and the bottom wall of the associated larger tank may include a plurality of valve assemblies similar to the valve assemblies 26 opening upwardly therethrough and downwardly into the corresponding pressurized chambers. Thus, a large tank may have a plurality of air inlets opening thereinto and each outlet may be provided with its own filter panel, or a one piece filter panel may be supported from the plurality of air inlet valves. In addition, each pressure chamber of such a plurality of standard portions also may include a light assembly corresponding to the light assembly 42 and each standard portion may be equipped with a seal member corresponding to the seal member 64 and performing substantially the same function.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the invention.

What is claimed as new is as follows:

1. A liquid reservoir fluid treatment system including base means defining an upwardly opening pressure chamber, upwardly opening tank means for containing liquid and including a bottom wall disposed over and removably supported upon said base means with said bottom wall removably sealingly closing the upper end of said chamber against the loss of pressurized fluid from said chamber, fluid pressure means operatively disposed to discharge fluid under pressure into said chamber, said bottom wall including pressure differential fluid inlet means operative to admit fluid under pressure from said chamber into said tank through said bottom wall responsive to said fluid under pressure being at a greater pressure than the pressure of liquid in said tank adjacent said bottom wall and to prevent the flow of liquid from said tank into said chamber when the pressure of fluid in said chamber is not greater than the pressure of liquid in said tank adjacent said bottom wall.

2. The system of claim 1 wherein said inlet means includes an inlet check valve structure removably secured through said bottom wall.

3. The system of claim 2 including a filter panel within said tank including a central portion thereof supported from said valve structure in spaced relation with and above said bottom wall.

4. The system of claim 3 wherein said tank comprises an aquarium, said aquarium including marine vegetation therein supported from said filter panel.

5. The system of claim 1 wherein said bottom includes an opening formed therethrough, said inlet means including an inlet check valve structure removably secured in said opening.

6. The system of claim 1 wherein said bottom includes a downwardly convexed partial spherical area from which said fluid inlet means is supported, said pressure chamber including peripheral wall means terminating upwardly in a peripherally continuous seat in which said partial spherical area is seated.

7. The system of claim 6 wherein said peripherally continuous seat includes a rigid annular seat portion and a resilient annular seal supported therefrom projecting slightly above said seat portion for forming a fluid tight seal with said partial spherical area and downwardly compressible upon the support of said tank therefrom to a position substantially coextensive with said seat portion for non-yielding support of at least a portion of the load represented by said tank and its contents directly from said seat portion.

8. An aquarium assembly including an upwardly opening tank closed at its bottom by a bottom wall, a support base, said support base defining a hollow upwardly opening standard terminating upwardly in an upwardly facing seal-equipped terminal end upon which said bottom wall is removably supported, sealing the closing of the upper end of said standard, the interior of said standard comprising a closed pressure chamber, means operative to supply air under pressure to said pressure chamber, the portion of said bottom wall closing the upper terminal end of said tubular standard including check valve air inlet means operative to admit air under pressure from said pressure chamber into the interior of said tank through said bottom wall portion responsive to air pressure in said chamber being greater than the static pressure of water within said tank.

9. The aquarium assembly of claim 8 including horizontal filter panel means supported within said tank above said bottom wall in generally centered relation to said check valve air inlet means and through which air admitted into the interior of said tank through said check valve air inlet means may pass.

10. The aquarium assembly of claim 9 wherein said filter panel means includes light diffusing properties, the interior of said pressure chamber including electrically actuated illuminating means, said portion of said bottom wall being transparent.

11. The aquarium assembly of claim 9 including marine vegetation supported from said filter panel means.

12. The aquarium assembly of claim 9 wherein said check valve air inlet means includes a portion thereof projecting upwardly above adjacent portions of said bottom walls and said filter panel means is supported from said check valve air inlet means.

13. The method of effecting total circulatory liquid flow of water within an aquarium including a partially spherical bottom wall central portion and means for filtering the circulating water within the aquarium and simultaneously aerating the water within the aquarium, said method comprising supporting a horizontal filter panel within an aquarium in spaced relation above the interior surface of the bottom wall central portion such that water can freely circulate underneath the filter panel, admitting aerating air under pressure into said aquarium through said bottom wall central portion at a point spaced below the central area of said filter panel and conveying said air through closed passage means passing centrally upwardly through said filter panel and opening outwardly into the interior of said aquarium at a point spaced closely above said filter panel, at least the central portion of said filter panel being pervious to the upward flow of water to be filtered therethrough.

* * * * *